July 5, 1960

E. H. ANDERSON 2,943,830

MIRROR SUPPORT

Filed March 27, 1959

INVENTOR
ERNEST H. ANDERSON
BY Richard S. Hayes
ATTORNEY

July 5, 1960     E. H. ANDERSON     2,943,830
MIRROR SUPPORT

Filed March 27, 1959                                  2 Sheets-Sheet 2

INVENTOR
*ERNEST H. ANDERSON*

BY *Richmond S. Hayes*

ATTORNEY

United States Patent Office 2,943,830
Patented July 5, 1960

2,943,830
MIRROR SUPPORT
Ernest H. Anderson, 225 Bowen St., Jamestown, N.Y.
Filed Mar. 27, 1959, Ser. No. 802,487
8 Claims. (Cl. 248—28)

This invention relates to improvements in supports for mirrors or the like and is directed to the provision of a support that will mount a mirror above a dresser, bureau, vanity table or similar article of furniture in a convenient and conventional position of use. The invention is a continuation in part of my co-pending application Serial No. 454,048, filed September 3, 1954, now abandoned.

It is therefore one of the objects of the invention to provide a support for a mirror that is strong, of simple construction, and relatively inconspicuous when in use.

Another object of the invention lies in the provision of a support for a mirror that may be quickly and easily installed without the aid of special tools or equipment.

A further object of the invention lies in the provision of a support for a mirror that is sufficiently rugged to be capable of sustaining the weight of as large and heavy a mirror as may be required for dressers, vanity tables, and similar articles.

An important object of the invention is to provide a support that will mount a mirror having any conventional hanger or bail attached thereto.

Other and further objects of the invention will be more fully understood from a consideration of the following specification, taken in conjunction with the accompanying drawing; in which.

Figure 1:
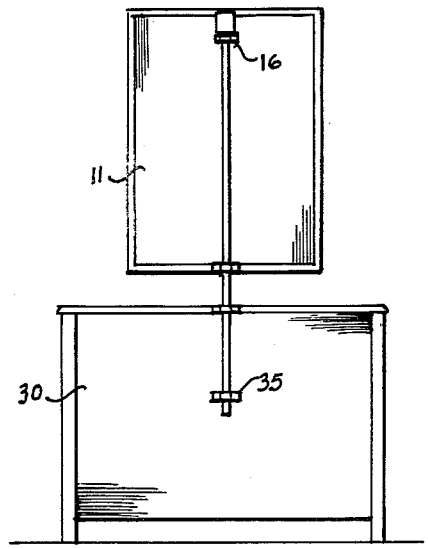
Fig. 1 is a rear elevationl view showing one form of the invention mounting a mirror above a dresser or other similar article.
Figure 2:
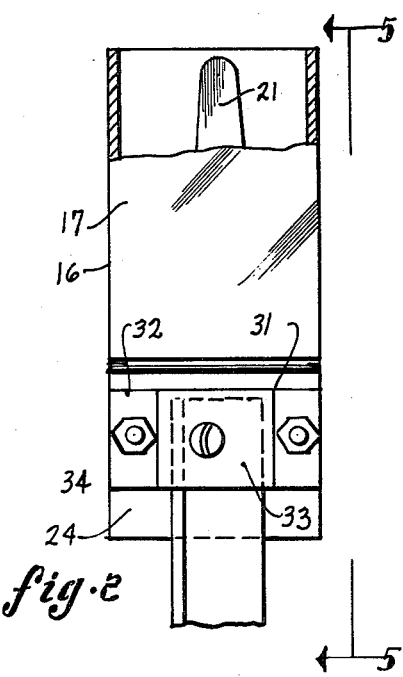
Fig. 2 is a greatly enlarged fragmentary, rear elevational view, partly broken away, and being taken as suggested by the circle in Fig. 1.

Referring more particularly to the drawings, the reference numeral 10 is employed to generally designate a support for a mirror 11. The mirror is shown to be provided with a hanger 12 which includes a base 13 fastened to the rear of the mirror and a strap bail or eye 14. The base 13 is usually secured to the mirror backing by rivets at the time the mirror is assembled. Such hangers are commonly supplied with mirrors to enable their being hung through the use of anchor hooks or their equivalent engaged with a building wall.

Figure 4:
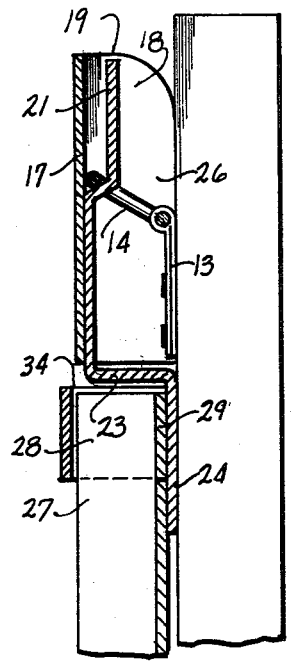
Fig. 4 is a vertical sectional view, taken substantially on the line 4—4 of Fig. 3.

As presently disclosed, the invention resides in the provision of a channel 16, or its equivalent, which consists of a base wall 17 and side walls 18. The upper ends of the side walls 18 are curved or rounded at 19, substantially as shown in the drawing. A hook 21, formed from or carried by a plate 22 is permanently located in the bracket by welds or screws (Figs. 4 and 8) and is so positioned that the end of the hook is slightly below the rounded ends 19 of the walls 18. Of course, the plate and hook are centered with respect to the side walls 18. In the original disclosure the plate 22 was a separate element from a further plate secured to the base wall 17 of the channel. However no deviation from the invention occurs by making the further plate a continuation of plate 22 substantially as shown in the present drawing. At the lower end of the channel, the plate 22 is flanged, as at 23 and again at 24. Flange 23 offsets flange 24 approximately into the plate of the edges 26 of the side walls 18. A mounting member 27 for the channel 16, in one form, consists of an angle bar having flanges 28 and 29. This bar projects into a bracket 31 attached along its flanges 32 to one face of the plate 22 beneath the channel 16. The bracket 31 includes inclined and vertical flanges 33 and 34 which, in cooperation with the plate 22, provide a transverse triangular opening into which one end of the member 27 projects. A screw 36, threaded into the inclined flange 33, engages the member 27 at the point of meeting of flanges 33 and 34 and when turned down serves to mount and secure the channel. The mounting member or bar to which the channel is attached may be secured to the rear vertical wall of an article of furniture, such as designated at 30, by means of two brackets 35, similar to bracket 31. Herein the bracket end flanges bear against the article, being suitably secured thereto, and cooperate with said article to create a transverse triangular opening through which the member 27 projects to be secured against displacement by screws 36.

Figure 7:
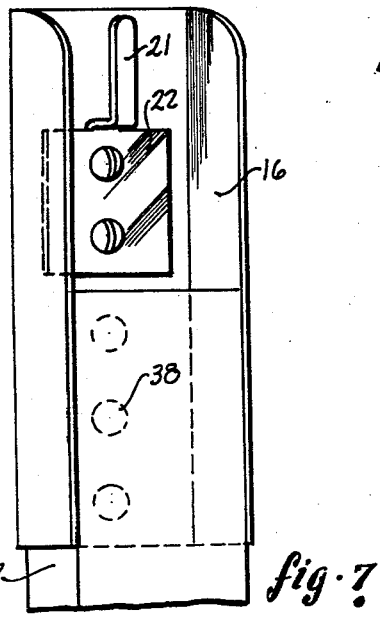
Fig. 7 is a fragmentary perspective view showing the mirror engaging bracket fitted to one end of a solid bar.

Instead of continuing the plate 22 beneath the channel 16 as an offset flange on which to locate bracket 31 to secure bar 27, it is proposed to shorten the plate 22 and weld or otherwise secure it and the hook 21 to the channel base wall 17, substantially as shown in Fig. 7. The relationship of hook and channel is identical with the above description relating thereto. However, instead of attaching a bar securing bracket 31, it is proposed to project a bar 37 into the lower end of the channel. This bar, although shown as a solid wooden member engaged with the channel by screws 38, could readily be a further channel proportioned to telescope the channel and be secured thereto in any convenient manner. This variation in structure eliminates certain structural elements, thus reducing the cost of the support in its entirety and obviously enables a user to purchase the channels and supply his own mounting bars or rods.

Figure 3:
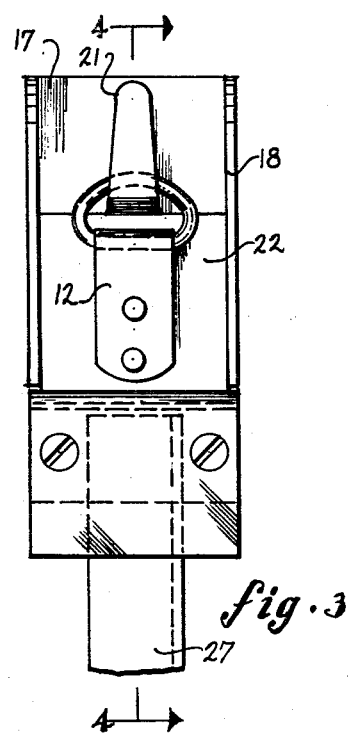
Fig. 3 is a front elevational view of the mirror support, the mirror being removed to disclose the position of the mirror hanger on the supporting hook.
Figure 8:
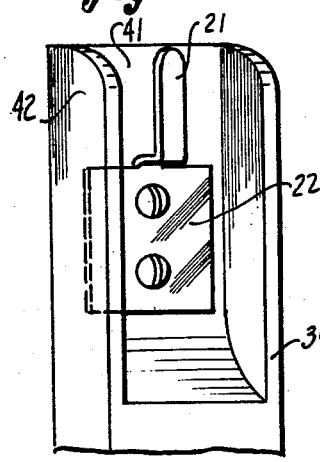
Fig. 8 is a view similar to Fig. 7 showing a channel, of the order of the bracket in Fig. 2, to be formed in one end of a support bar.

It is proposed to utilize another variation of the above described structure and attention is directed to Fig. 8. Herein, to provide an even simpler and more economical support for a mirror, a wooden bar 39 is formed at one end with structure identical to the channel 16. It will be noted that this bar is grooved or recessed and includes a base wall 41 and side walls 42. The length of the groove is adequate to locate the plate and hook in the same relationship as shown in Figs. 3 and 7 and, of course, the ends of walls 42 are properly rounded.

Figure 5:
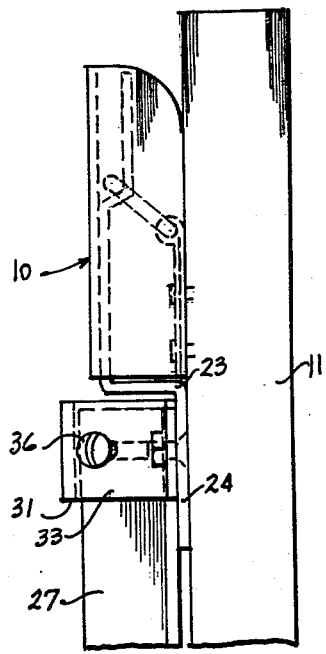
Fig. 5 is a side elevational view of the mirror mounted on the support and is taken as suggested by the line 5—5 of Fig. 2.
Figure 6:
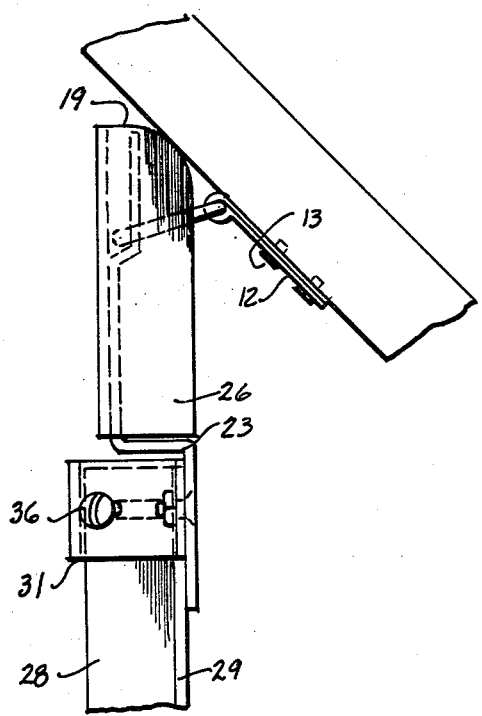
Fig. 6 is a view similar to Fig. 5 showing the manner in which the mirror hanger is engaged or disengaged with respect to the support.

Giving attention to Fig. 6, it will be noted that to mount a mirror the bail is first swung away from the mirror back. This bail is then engaged with the hook 21, being moved downwardly to the hook base. The mirror now rests against the rounded ends 19 of the channel side walls 18. It now only remains to swing the mirror from the position of Fig. 6 to that of Fig. 5 to complete the mounting operation. As may be seen, the back of the mirror rests against the channel walls 18 and offset flange 24 (Fig. 5). With the structure of Figs. 7 and 8, the mirror back would contact a considerable portion of the bar 37 or 39. It is pointed out that the hook is offset from the channel base sufficiently to be engaged by the bail of any conventional hanger and also that regardless of bail size or length, it will angularly adjust to enable abutment of the mirror back with the channel. During a mounting operation, the mirror is guided into position by the rounded ends of the channel bearing against backing and although sliding movement occurs, the rounded ends, being smooth, have no tendency to scratch or mar this backing. Either bar 37 or 39 may be secured to the article 30 in any convenient manner, such as by screws or straps.

Although applicant has shown and described variations in a channel member for use in mounting articles such as mirrors, it is evident that these variations are within the spirit and scope of the invention insofar as they are set out in the annexed claims.

Having thus set forth my invention, what I claim as new and for which I desire protection by Letters Patent is:

1. A support for mounting a mirror on an article of furniture comprising a channel shaped bracket, a hook located within the confines of said bracket, said hook being adapted to engage a hanger attached to a mirror, the side walls of said bracket providing a protective guard for the back of said mirror during engaging or disengaging said hanger, a supporting bar, means operable to secure one end of said bar to said bracket, and means attachable to an article of furniture, the other end of said bar being engaged with said means.

2. A support for mounting a mirror on an article of furniture comprising a bracket, means on said bracket for receiving and engaging a hanger attached to a mirror, parts of said bracket providing a protective guard for the back of said mirror during engaging or disengaging said hanger, a portion of said bracket being centrally offset to provide a transverse enclosure, a rigid bar, one end of said bar projecting into the enclosure of said bracket, means securing said bar against displacement from said bracket, and other means attachable to an article of furniture adapted to receive and secure the other end of said bar.

3. The combination of a swingable bail-like hanger attached to a mirror with a support comprising an elongated bar, a channel extending lengthwise from one end of said bar, a hook in said channel, means mounting said hook to extend in spaced, substantially parallel relation with the base wall of said channel and with the free end thereof terminating slightly below the upper ends of the side walls of said channel, said channel ends being formed to provide a contact path of travel for said mirror when said hanger engages said hook and said mirror is moved into assembled relationship with said support.

4. The combination of a mirror mounted hanger having a swingable bail with a support comprising an elongated bar proportioned to be engaged with and secured to one end of a channel member, said channel member having side walls terminating in curved upper ends, a hook secured to the base wall of said channel, said hook being spaced from and parallel with said channel base wall and terminating within the upper limits of all of said channel walls, said bail being engageable with said hook and movable to the closed end thereof and causing the attached mirror to contact and move along the curved ends into full contact with the channel side walls.

5. A support for mounting a mirror in an upright position above an article of furniture, said support comprising a bail-like hanger attached to said mirror in combination with a mounting member consisting of an elongated rigid bar, a channel member at one end of said bar extending in the direction of the bar length and forming an end continuation, the cross sectional proportions of said bar being no greater than those of said channel member, a plate secured to the base wall of said member having a laterally offset upwardly opening hook, substantially uniformly curved portions terminating the upper ends of the side walls of said member, the free end of said hook being within the limits of said portions, said mirror, when said hanger is engaged with said hook, resting against said curved portions which serve as a contact path over which said mirror moves from the point of initial hook and hanger engagement to abutment of said mirror with the edges of said side walls, and means for securing said bar in an upright position on said article.

6. A support for mounting a mirror in an upright position above an article of furniture, said support comprising a bail-like hanger attached to said mirror in combination with a mounting member consisting of an elongated rigid bar, a channel member, a bracket secured to one end of said member and having a centrally offset portion providing a transverse enclosure, one end of said bar projecting into said bracket, means frictionally securing said bar to said bracket, the side walls of said member terminating at their upper ends in uniformly curved portions, an upwardly projecting hook secured to the base wall of said member and having its free end within the limits defined by said curved portions, said mirror, when said hanger is engaged with said hook, resting against said curved portions which serve as a contact path over which said mirror moves from the point of initial hook and hanger engagement to abutment of said mirror with the edges of said side walls, and means for securing said bar in an upright position on said article.

7. A support for mounting a mirror in an upright position above an article of furniture, said support comprising a bail-like hanger attached to said mirror in combination with a mounting member comprising an elongated rigid bar, a channel member consisting of a relatively wide base and shallow side walls, said side walls terminating at their upper ends in uniformly curved portions, an upwardly extending hook secured in spaced relation to said base with the free end of said hook located within the limits of the upper end of said member, said mirror, when said hanger is engaged with said hook, resting against said curved portions which serve as a contact path over which said mirror moves from the point of initial hook and hanger engagement to abutment of said mirror with the edges of said side walls, one end of said bar projecting into and fitting the walls of the lower end of said channel member and being secured thereto, and means for securing that portion of said bar remote from said channel member to said article.

8. A support for mounting a mirror in an upright position above an article of furniture, said support comprising a bail-like hanger attached to said mirror in combination with a mounting member comprising an elongated rigid bar, a channel formed at one end of said bar, said channel consisting of a recessed area defined by a base wall and relatively shallow side walls, the upper ends of said side walls being uniformly curved, an upstanding hook secured in spaced relation to said base wall with the free end thereof located within the limits of the end of said channel, the lower end of said channel blending into the body of said bar, means for securing that portion of said bar remote from said channel to said article, said mirror, when said hanger is engaged with said hook, resting against said curved portions which serve as a contact path over which said mirror moves from the point of initial hook and hanger engagement to abutment of said mirror with the edges of said side walls.

References Cited in the file of this patent

UNITED STATES PATENTS 2,598,531   Garrett   May 27, 1952

FOREIGN PATENTS 504,416   Great Britain   Apr. 25, 1939